United States Patent [19]

Hauth

[11] 3,746,133

[45] July 17, 1973

[54] DEVICE FOR TAKING UP WEAR FOR A DISC BRAKE AND A BRAKE INCLUDING SAID DEVICE

[75] Inventor: Jean-Marc Laurent Hauth, Pont-A-Mousson, France

[73] Assignee: Pont-A-Mousson S.A., Pont-A-Mousson, France

[22] Filed: June 9, 1972

[21] Appl. No.: 261,467

[30] Foreign Application Priority Data
June 25, 1971 France .............................. 7123342

[52] U.S. Cl. ............................ 188/196 BA, 188/71.9
[51] Int. Cl. ............................................. F16d 65/56
[58] Field of Search .................... 188/71.9, 79.5 GE, 188/106 F, 196 D, 196 BA

[56] References Cited
UNITED STATES PATENTS

| | | | |
|---|---|---|---|
| 2,669,327 | 2/1954 | Chamberlain et al. | 188/71.9 |
| 3,068,964 | 12/1962 | Williams et al. | 188/196 D X |
| 3,261,435 | 7/1966 | Beatty | 188/196 BA |
| 3,550,732 | 12/1970 | Beller | 188/71.9 |

Primary Examiner—Duane A. Reger
Attorney—Richard Sughrue, Robert J. Seas, Jr. et al.

[57] ABSTRACT

This device for automatically taking up wear for a brake having a disc and a brake pad caliper controlled hydraulically and/or mechanically is of the type having a screw, a nut and a piston exerting a pressure on the screw. A ring having oblique teeth and slidably keyed on the screw meshes with a radial finger member. When braking the ring advances with the screw. When the braking ceases, the screw moves back immediately but as the ring is axially movable, it only moves back under the effect of spring-loaded finger members when the screw and nut system is no longer under load and then rotates, if necessary, the screw with respect to the nut.

Any risk of jamming of the device taking up wear is avoided and the wear is taken up irrespective of the control means employed, namely hydraulic or mechanical.

6 Claims, 5 Drawing Figures

Patented July 17, 1973

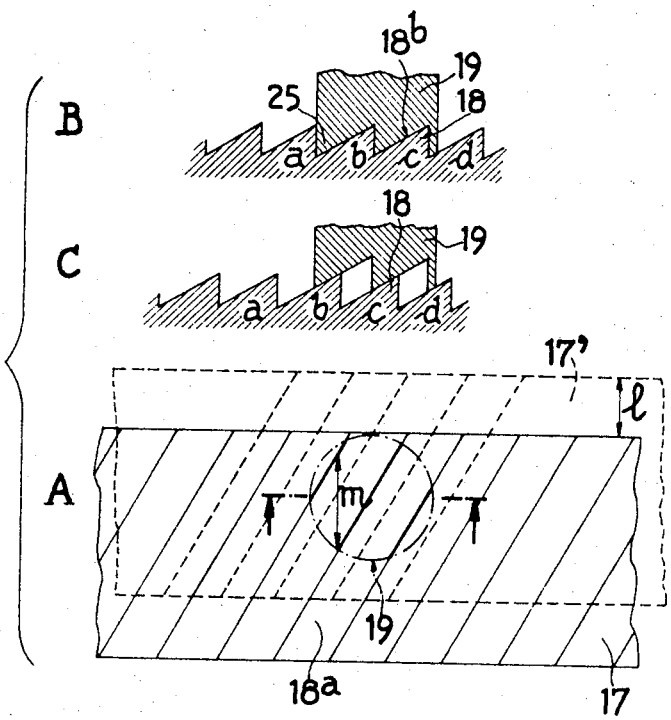
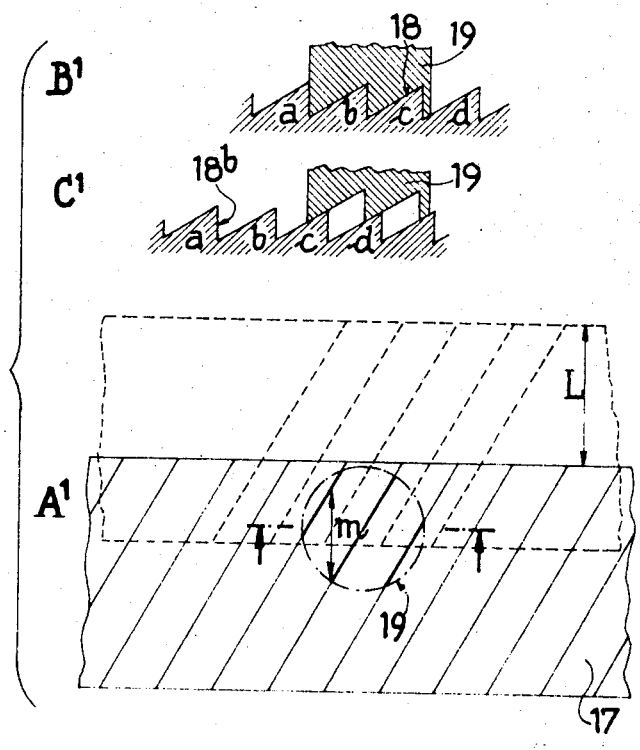
Fig.3
Fig.4

DEVICE FOR TAKING UP WEAR FOR A DISC BRAKE AND A BRAKE INCLUDING SAID DEVICE

The present invention relates to disc brakes for vehicles and more particularly to devices for automatically taking up wear of the brake pads.

It is well known in disc brakes automatically to compensate for the wear of the friction or brake pads by means of devices which take up wear and are of the screw and nut type in which one of the elements rotates whereas the other is stationary. One of the elements is rotated, in the course of releasing the brake, through a ring which is connected to rotate and move in translation with this element and is provided with teeth meshing with a finger member or lever which does not participate in the movements of the ring but is capable of moving away therefrom in opposition to elastically yieldable means. This type of device has a drawback. At the start of the release of the brake the pads are still in contact with the disc and the screw and nut system is still subjected to a large axial force on the part of the pads, so that, owing to friction between the screw and the nut, no relative rotation can occur between the screw and the nut and this has for consequence a jamming of the system which prevents the return of the pads or prevents the operation of the device for taking up wear.

An object of the present invention is to provide a device for taking up wear of the brake pads for a disc brake which is improved in such manner as to overcome this drawback.

The invention provides a device of the aforementioned screw and nut type, one of the elements being movable and moved by a toothed ring which is concentric with the movable element and co-operates with a radially movable finger member, wherein said ring, which has on its outer face teeth which are parallel to each other and oblique relative to the generatrices of the ring, is slidably keyed relative to the movable element and combined with resiliently yieldable thrust means which bias the ring against said movable element.

Owing to the fact that the ring is slidably keyed relative to the moving element of the screw and nut system, the rotation of the movable element with respect to the fixed element of the system is only brought about by the rearward movement of the ring under the action of the thrust means when the screw and nut system is no longer under load, whereby there is no longer any risk of the device taking up wear, jamming or failing to operate.

Another object of the invention is to provide a disc brake provided with the improved automatic device for taking up wear.

Further features and advantages of the invention will be apparently described with reference to the accompanying drawings.

In the drawings:

FIG. 3 shows in the case of a limited amount of wear of the pads, a diagram in plan (A) and vertical sectional diagrams (B and C) relating to the operation of the engagement of the toothed ring with the radial finger member of the device according to the invention, the sections B and C being taken on line 3—3 of the diagram A;

FIG. 4 shows similar diagrams $A^1$, $B^1$, $C^1$ in the case of a considerable amount of wear of the brake pads which requires to be taken up automatically;

Figure 1:
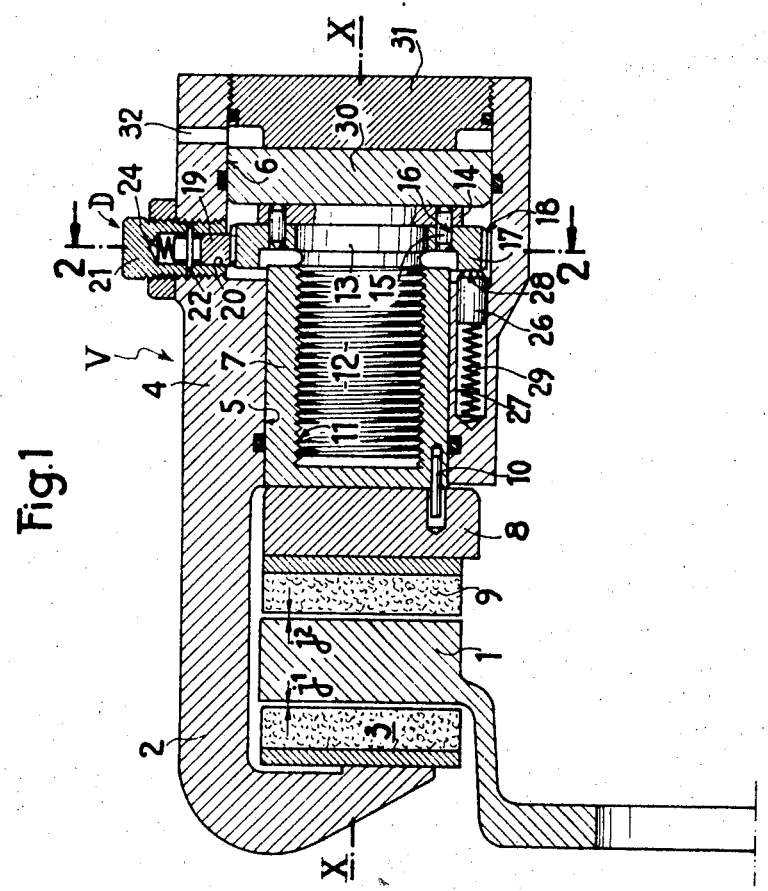
FIG. 1 is a diagrammatic radial axial sectional view of a hydraulically controlled disc brake provided with a device for automatically taking up wear according to the invention.
Figure 2:
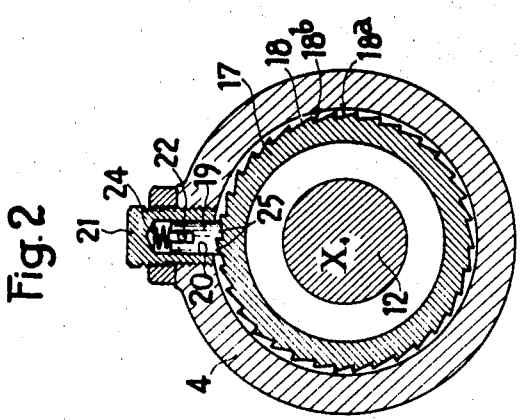
FIG. 2 is a diagrammatic sectional view taken on line 2—2 of FIG. 1.

In the embodiment shown in FIGS. 1 and 2, the invention is applied to a disc brake having a disc 1 which is connected to rotate with a wheel to be braked (not shown) and a caliper 2 which is slidable relative to the disc 1 in a direction perpendicular to the latter.

The caliper carries, on one side of the disc 1, a friction or brake pad 3 and, on the other side, a control cylinder device V combined with the improved device D for automatically taking up wear.

The cylinder device V and the device D have a common cylindrical body 4 which is in one piece with, or rigidly secured to, the caliper 2. The body 4 comprises on an axis X—X, parallel to the axis of the wheel to be braked, a stepped cylinder or cavity 5, 6. A piston 7 of the cylinder device V is axially movable in the portion 5.

Placed on the end of the piston 7 is a support plate 8 which carries a friction or brake pad 9 adapted to bear against the opposite side of the disc 1 to the pad 3. The support plate 8 is rendered integral with the piston 7 by a pin 10.

The piston 7 is provided with a screwthreaded blind aperture 11 and thus constitutes a nut in which is screwthreadedly engaged a screw 12 whose screwthreaded portion is follwed by a smooth cylindrical bearing portion 13 which is followed by a head 14 having a diameter exceeding the diameter of the bearing portion 13. The head is provided with axially extending studs 15 which are arranged along its peripheral marginal portion and are slidable in corresponding apertures 16 in a ring 17. The latter is slidable on the portion 13 of the screw 12 with respect to which it is therefore slidably keyed. The ring has on its outer face teeth 18 which are parallel to each other and oblique relative to the generatrices of the ring. These teeth 18 have a dissymetrical profile in the form of saw teeth having a very inclined face 18 and a steep face 18' (FIG. 2).

A finger member 19 is slidably keyed in a blind radial aperture 20 formed in a member 21 secured to the body 4, for example by means of a pin 22 which is fixed in the member 21 and extends into a slot 23 in the finger member 19. The latter is resiliently biased by a spring 24 toward the ring 17 against which it bears by its end portion which is provided with teeth 25 (FIG. 3) corresponding to the teeth 18 of the ring with which they engage.

Finger members 26 parallel to the axis X—X are slidably mounted in blind apertures 27 in the body 4 and bear against the lateral face 28 of the ring 17 under the action of springs 29.

Placed at the rear of the screw 12 is a flat piston 30 which is floating and slidable in the second stepped portion 6 of the aperture of the body 4 and screwed in the screwthreaded end portion of this stepped portion 6 is a closing plug 31. An aperture 32 is an inlet for the fluid for controlling the brake which is supplied between the piston 30 and the plug 31 in the cylinder 6.

The device operates in the following manner:

When applying the brake, the control fluid is supplied by way of the aperture 32 between the plug 31 and the piston 30. Under the effect of this fluid, the piston 30 axially urges the screw 12 by acting on its head 14. The latter axially shifts the toothed ring 17. The screw 12 axially shifts the piston 7 which in turn causes the brake pad 9 to bear against the disc 1 through the medium of the support plate 8. In view of the fact that the caliper 2 is slidable, by reaction, the brake pad 3 bears against the disc 1 on the opposite side of the pad 9.

If the wear of the brake pads 3 and 9 is of small amount, when braking, the ring 17 moves to 17′ (FIG. 3 and diagram A) through a distance $l$ which is less than the distance $m$ corresponding to the axial advance of the ring necessary to ensure that a tooth of the ring, such as the tooth 18 (diagrams A and B) engaged in a recess of the finger member 19, passes into the neighbouring recess of this finger member. The finger member 19 thus moves away from the ring under the effect of the slight slope of the faces $18^a$ of the teeth of the ring 17 and assumes the position shown in diagram C but does not jump a tooth of this ring, so that, when releasing the brake, the brake pads 3 and 9 are urged rearwardly by the disc and carry along therewith the piston 7 and the screw 12 with its head 14. The ring 17 is also urged rearwardly by the finger members 26 under the action of the springs 29. Thus the finger member 19 is caused to slide on the faces $18^a$ having a slight slope of the teeth of the ring 17 without rotating the latter and the assembly is returned to its initial condition (diagram B).

On the other hand, if the wear of the brake pads exceeds a certain value in the course of braking, the ring 17 is moved a distance L exceeding the distance $m$ (see FIG. 4). The edges of the teeth 18 of the ring 17 pass, in diagram A, from the position in full line to the position in dotted line, that is the ring jumps one tooth under the finger member 19 (compare in the diagrams $B^1$ and $C^1$ the positions assumed by the sections $a, b, c, d$, of the four teeth). When ceasing the braking, the brake pads 3 and 9 are urged rearwardly by the disc 1 and carry along therewith the piston 7 and the screw 12 with its head 14. Owing to the fact that one tooth has been jumped and to the steep slope of the faces $18b$ of the teeth of the ring, the latter must, in order to be urged rearwardly by the finger members 26, rotate to the extent of one tooth, the tooth of section $b$ for example is substituted for the tooth of section $a$ in diagram $B^1$, and rotate the screw 12 therewith. However, the screw 12 and the piston or nut 7 are still under load and cannot rotate with respect to each other and there is therefore produced a rearward movement of the screw 12, its head 14 and the studs 15 without a rearward movement of the ring 17. When the brake pads 3 and 9 are no longer in contact with the disc 1, the system comprising the screw 12 and the nut 7 is no longer under load and one of the elements is able to rotate relative to the other so that, under the action of the springs 29 and finger members 26, the ring 17 is able to move rearwardly and cause the spring 12 to rotate in the nut 7, which is prevented from rotating by the pin 10, so as to lengthen the screw and nut system and take up the wear of the pads and maintain at a minimum value the sum of the clearances $j^1+g^2$ between the pads 3 and 9 and the disc 1.

Owing to the fact that the ring 17 is not axially connected to the screw 12 and to the sliding of the ring on the studs 15 of the screw which render the screw and the ring interconnected as concerns rotation, the wear of the brake pads 3 and 9 is taken up when this wear produces a clearance between the pads and the disc exceeding a certain value by lengthening the screw and nut system. This lengthening by rotation of the screw 12 in the nut 7 occurs under the effect of the rotation of the ring 17 when the latter moves rearwardly. This rearward movement of the ring 17 only occurs when the system comprising the screw 12 and the nut 7 is no longer under load, that is, when the brake pads 3 and 9 are no longer in contact with the disc 1. Thus, there is never any jamming of the system for taking up wear when releasing the brake.

Figure 5:
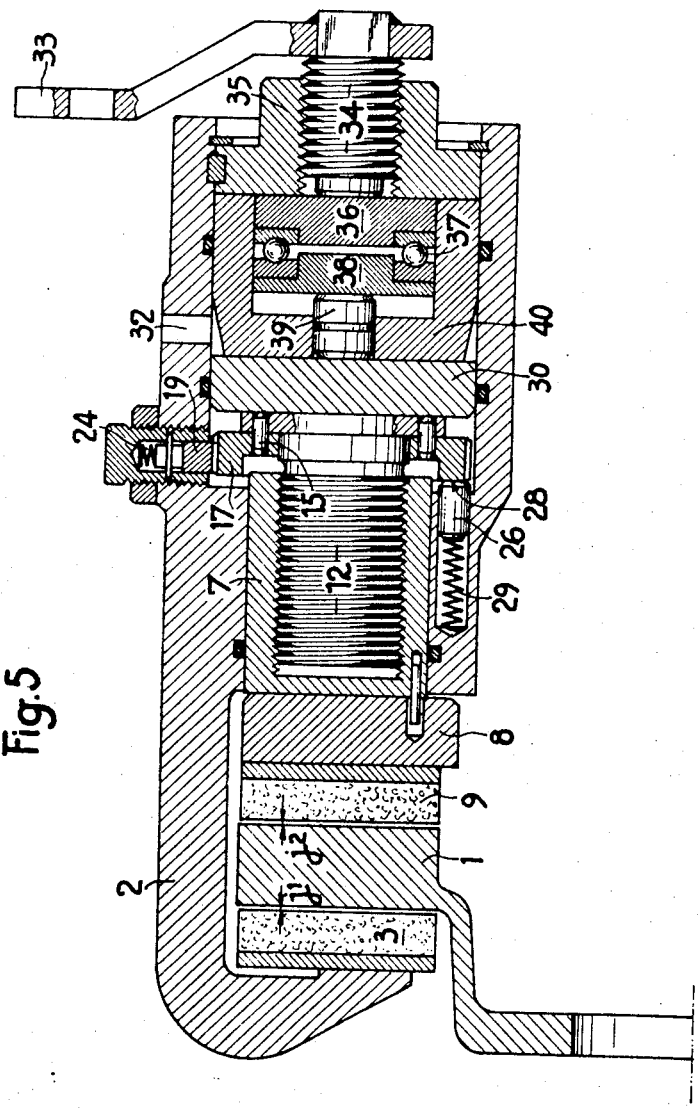
FIG. 5 is a diagrammatic sectional view of a modification of a mechanically and hydraulically controlled disc brake improved in accordance with the invention.

According to the modification shown in FIG. 5, the invention is applied to a brake having a combined hydraulic and mechanical control which thus permits operating the brake either by the entry of fluid by way of the aperture 32 or by rotation of a control arm 33. The addition of a mechanical control device modifies neither the device for taking up wear nor its operation. Indeed, instead of shifting the piston 30 by means of a fluid when braking, the lever 33 is rotated so as to rotate a screw 34 in a fixed nut 35. When the lever 33 is rotated, the screw 34 moves toward the disc and exerts pressure, while rotating, on a plate 36 which exerts pressure through a rolling bearing 37 on a plate 38. The latter exerts a pressure on the piston 30 through an axial block 39 which is slidable in a piston 40 performing the function of a plug and applied against the nut 35 when braking by means of the hydraulic control.

Owing to this arrangement, when the braking is performed by the mechanical control or by the hydraulic control, the device for taking up wear operates since, irrespective of the control employed, it is the piston 30 which operates the brake and its device for automatically taking up wear. This is of particular advantage since the hydraulic control or the mechanical control can be employed without increasing the clearance $j^1 + j^2$ between the brake pads and the disc.

Having now described my invention what I claim as new and desire to secure by Letters Patent is:

1. A device for taking up wear of brake pad means of a disc brake and adapted to be interposed between the brake pad means and thrust means for urging the brake pad means against the disc of the brake, said device comprising means defining a body, a system having a longitudinal axis and movable longitudinally relative to the body and comprising a first element in the form of a screw and a second element in the form of a nut coaxial with and screwthreadedly engaged with the screw, one of said elements being rotatable about said axis relative to the body, means for preventing rotation of the other of said elements relative to the body, a ring concentric with the rotatable element, means for keying the ring to the rotatable element so that the ring is slidable relative to the rotatable element along said axis, first resiliently yieldable means for biasing the ring axially against the rotatable element, the rotatable element having an outer peripheral portion having teeth which are parallel to each other and oblique relative to radial axial planes of the ring, a finger member mounted in the body for movement radially of the ring and in engaging relation to the teeth, and second resiliently yieldable means for biasing the finger member against the teeth.

2. A device as claimed in claim 1, wherein said means keying the ring to the rotatable element comprise axially extending studs integral with the rotatable element and apertures in the ring into which apertures the studs extend, the rotatable element having a shoulder against which shoulder the ring is biased by the first resiently yieldable means.

3. A device as claimed in claim 1, wherein the first resiliently yieldable means comprise axially extending finger members and springs biasing the finger members against the ring.

4. A disc brake comprising a disc, a caliper, brake pad means, thrust means for urging the brake pad means against the disc, and a device means for taking up wear of the brake pad means interposed between the brake pad means and the thrust means, said device comprising means defining a body combined with the caliper, a system having a longitudinal axis and movable longitudinally relative to the body and comprising a first element in the form of a screw and a second element in the form of a nut coaxial with and screwthreadedly engaged with the screw, one of said elements being rotatable about said axis relative to the body, means for preventing rotation of the other of said elements relative to the body, a ring concentric with the rotatable element, means for keying the ring to the rotatable element so that the ring is slidable relative to the rotatable element along said axis, first resiliently yieldable means for biasing the ring axially against the rotatable element, the rotatable element having an outer peripheral portion having teeth which are parallel to each other and oblique relative to radial axial planes of the ring, a finger member mounted in the body for movement radially of the ring and in engaging relation to the teeth, and second resiliently yieldable means for biasing the finger member against the teeth.

5. A disc brake as claimed in claim 4, comprising hydraulic means for applying the brake, the hydraulic means comprising means defining a cylinder combined with the caliper, a floating piston engaging the rotatable element, and a fluid inlet communicating with the cylinder on the opposite side of the piston to the rotatable element.

6. A disc brake as claimed in claim 5, further comprising a mechanical control means combined with the caliper and capable of shifting the floating piston.

* * * * *